US008645706B2

(12) United States Patent  (10) Patent No.: US 8,645,706 B2
Parkinson  (45) Date of Patent: Feb. 4, 2014

(54) PREVENTING ERROR IN AN ACCESS PROTOCOL

(75) Inventor: Steven William Parkinson, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 1245 days.

(21) Appl. No.: 11/469,468

(22) Filed: Aug. 31, 2006

(65) Prior Publication Data

US 2008/0072302 A1 Mar. 20, 2008

(51) Int. Cl.
*G06F 21/00* (2013.01)
*G06F 7/04* (2006.01)
*G06F 17/30* (2006.01)

(52) U.S. Cl.
USPC ........................................................ 713/183

(58) Field of Classification Search
USPC ................................ 713/183; 726/9; 380/277
See application file for complete search history.

(56) References Cited

U.S. PATENT DOCUMENTS

| 5,012,469 | A  |   | 4/1991  | Sardana |          |
|-----------|----|---|---------|---------|----------|
| 5,940,369 | A  |   | 8/1999  | Bhagavath et al. | |
| 6,457,066 | B1 |   | 9/2002  | Mein et al. | |
| 6,574,675 | B1 |   | 6/2003  | Swenson | |
| 6,799,286 | B1 | * | 9/2004  | Evans et al. | 714/57 |
| 6,879,579 | B1 |   | 4/2005  | Myles et al. | |
| 6,910,135 | B1 | * | 6/2005  | Grainger | 726/23 |
| 2002/0067832 | A1 | * | 6/2002 | Jablon | 380/277 |
| 2002/0113810 | A1 | * | 8/2002 | Radtke et al. | 345/710 |
| 2002/0120573 | A1 | * | 8/2002 | McCormick | 705/50 |
| 2005/0010693 | A1 | * | 1/2005 | Sinclair et al. | 709/250 |
| 2005/0154926 | A1 | * | 7/2005 | Harris | 713/202 |
| 2006/0041756 | A1 | * | 2/2006 | Ashok et al. | 713/183 |
| 2006/0052169 | A1 | * | 3/2006 | Britt et al. | 463/42 |
| 2006/0080544 | A1 | * | 4/2006 | Schaffer | 713/183 |
| 2006/0259973 | A1 | * | 11/2006 | Sima et al. | 726/25 |
| 2007/0033112 | A1 | * | 2/2007 | Nagle et al. | 705/26 |
| 2007/0061864 | A1 | * | 3/2007 | Bali et al. | 726/2 |

FOREIGN PATENT DOCUMENTS

JP  2005208765 A  *  8/2005  ............... G06F 1/00

OTHER PUBLICATIONS

Onishi et al. Machine translation of JP2005-208765, Aug. 4, 2005.*
Information Technology Services Division, State of Montana (ITSD). "ENT-SEC-063, Statewide Information Systems Policy, Usernames and Passwords", Jun. 2005.*
Software House. "C CURE 800/8000, Version 8.2 Enhanced Password Protection, Installation and Configuration Guide, Revision C", Apr. 2004.*

* cited by examiner

*Primary Examiner* — Michael Simitoski
(74) *Attorney, Agent, or Firm* — Lowenstein Sandler LLP (57) ABSTRACT

Embodiments of the present disclosure provide a flexible way of accommodating typical user errors when attempting to gain access. One method prevents an error in an access protocol by determining if an access request contains an error that may be forgiveable, such as repeated entry of the same incorrect password or the use of all capital letters. If the access request contains an error, the access request will be classified as invalid. As such, the invalid access request will not count against the number of allowed access requests. Errors may include repeated passwords, obvious typographical error, etc. A message may also be provided or sent to the user that informs the user of their error.

12 Claims, 7 Drawing Sheets

PREVENTING ERROR IN AN ACCESS PROTOCOL

FIELD

This invention relates generally to security systems and methods.

BACKGROUND

Access to most computer systems and applications require a user to establish a user account and to enter access information such as a username and password. A user's password is maintained in secret to prevent unauthorized access using the password. To gain unauthorized entry to a computer system, attackers may attempt to "guess" a user's password. Attackers attempt access by entering a username and trying different passwords in order to gain entry.

To prevent this attack, a user is allowed a limited number of attempts at accessing the user's account. When notified that the password entered was incorrect, a authentic user will often enter the same password in a second or more times. The user, for example, may be recalling a different password from a different account. However, when the user repeatedly, but mistakenly, enters the incorrect password, the entry of the incorrect password consumes the limited number of attempts. As a result, the user's account may be unnecessarily invalidated. The invalidation is probably unnecessary because an attacker would not repeatedly use the same incorrect password on the same account. Typically, only an authentic user would attempt the same password multiple times.

BRIEF DESCRIPTION OF THE DRAWINGS

The accompanying drawings, which are incorporated in and constitute a part of this specification, illustrate one embodiment of the invention and together with the description, serve to explain the principles of the invention.

DESCRIPTION OF THE EMBODIMENTS

During an attempt to gain access to a secure system, a user may repeatedly, but mistakenly, enter an incorrect password, for example, a repeated password or obviously erroneous password. The entry of the incorrect password consumes the limited number of attempts. As a result, the user's access request may be classified as an attack, and the user's account may be unnecessarily invalidated. According to embodiments of the present disclosure, a method prevents an error in an access protocol by determining if an access request contains an error. If the access request contains an error, the access request will be classified as invalid. As such, the invalid access request will not count against the number of allowed access requests. Errors may include repeated passwords, obvious typographical error, etc. A message may be sent to the user that informs the user of the obvious error.

According to embodiments, errors would be detected when the user has entered a password repeatedly or with an obvious error, such as all CAPS. The errors would not count that against the user's access limit. Accordingly, the user would not be denied access due to a harmless error.

Reference will now be made in detail to the exemplary embodiments of the invention, an example of which is illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Figure 1:
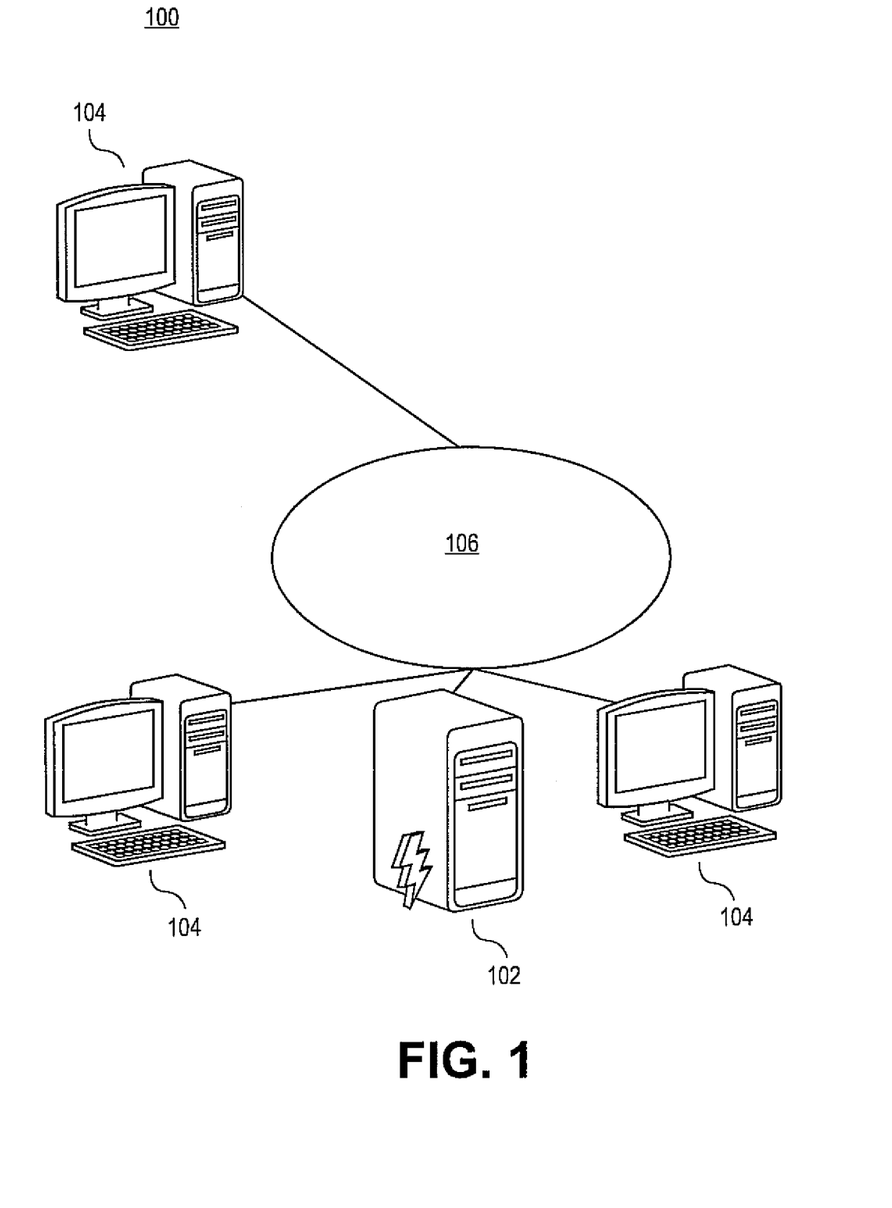
FIG. 1 is a diagram illustrating an exemplary network system consistent with embodiments of the present disclosure.

According to embodiments of the present disclosure, obvious errors may be prevented in an access protocol so that the user's access will not be improperly denied. FIG. 1 is a diagram illustrating a network system 100 in which the obvious errors may be prevented. System 100 may include a server 102 and clients 104. Server 102 and clients 104 may be interconnected via a network 106. Network 106 may be any type of network such as an internet, the Internet, a wide area network, or a local area network. FIG. 1 shows system 100 including three clients and one server connected via a single network. One skilled in the art will realize that system 100 may include any number of clients and servers connected via multiple networks.

Server 102 may be a computing machine or platform configured to execute a network system through an operating system in conjunction with clients 104. Server 102 may send data to clients 104 and receive data from clients 104. Server 102 may be configured to host secure destinations, such as SSL websites. Server 102 may be implemented with any known server platforms such as those from INTEL, ADVANCED MICRO DEVICES, HEWLETT PACKARD, etc. One skilled in the art will realize that the above server systems are exemplary and server 102 may be implemented in any known platform.

Clients 104 may be computing machines or platforms configured to execute applications to perform methods for preventing errors in an access protocol. Clients 104 may implements network application such as web browsers. Clients 104 may be implemented with personal computers, workstations, thin clients, thick clients, or other similar computing platforms. Clients 104 may use operating systems such as LINUX, WINDOWS, MACINTOSH or other available operating systems. One skilled in the art will realize that the implementations of clients 104 are exemplary and clients 104 may be implemented in any type of computer system.

Figure 2:
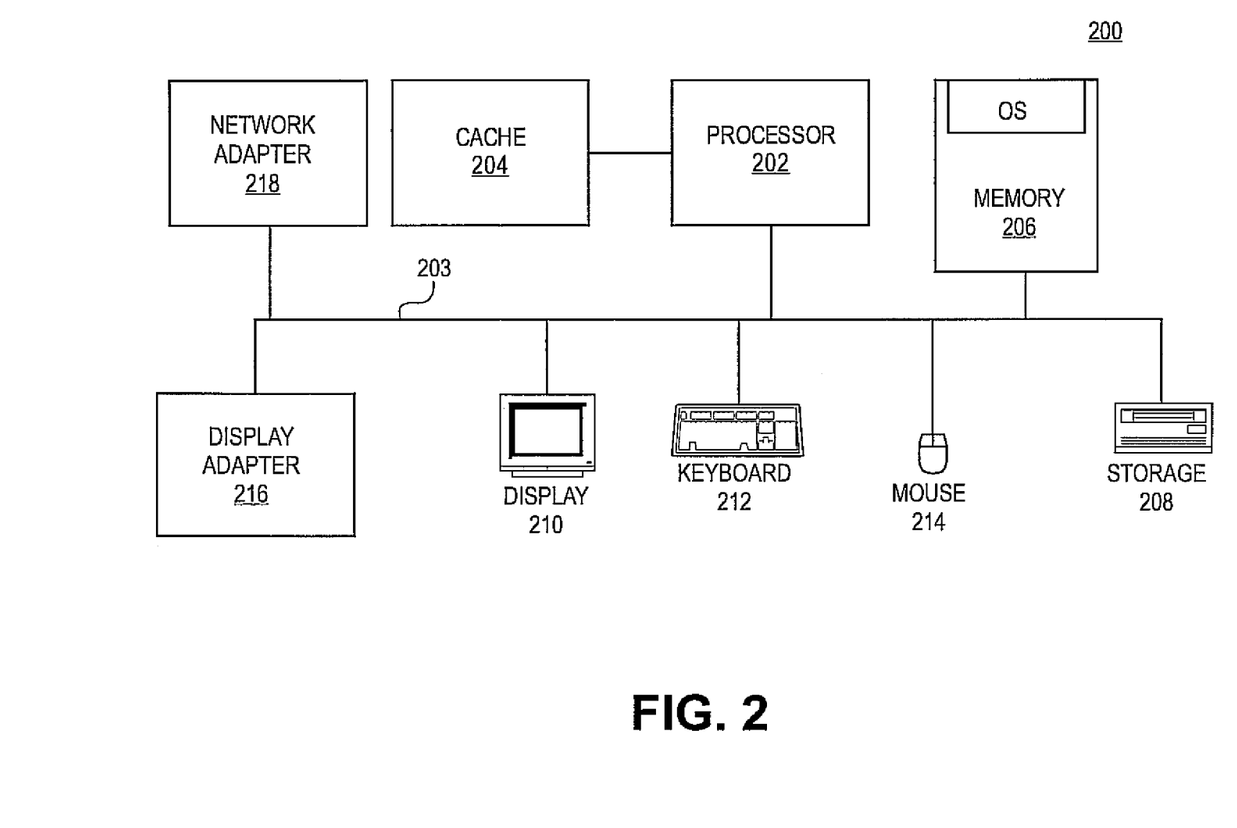
FIG. 2 is a diagram illustrating an exemplary computing platform consistent with embodiments of the present disclosure.

FIG. 2 is a block diagram of an exemplary computing platform 200 capable of performing embodiments of the present disclosure. Computing platform 200 may be utilized as clients 104 and server 102. Methods for preventing errors in an access protocol may be implemented in an application written in program code and executed by the computing platform 200. The application may be implemented in computer languages such as PASCAL, C, C++, JAVA, HTML and the like. For example, when a SSL website is being accessed, a web browser, such as Explorer, Firefox, etc., may be executed on computing platform 200. One skilled in the art will realize that the methods described above may be implemented in any computer language and any application capable of establishing a network connection.

As shown in FIG. 2, the computing platform 200 may include one or more processors such as the illustrated processor 202 that provide an execution platform for embodiments of the of the present disclosure. Processor 202 may be connected to a cache 204 to serve as a working memory. Commands and data from the processor 202 may be communicated over a communication bus 203.

Computing platform 200 may include a main memory 206, such as a Random Access Memory (RAM), where the operating system and applications implementing the methods described above may be executed during runtime. Main memory 206 may be coupled to communication bus 203.

Computing platform 200 may include one or more secondary memories 208. Secondary memories may be coupled to communications bus 203. The secondary memories 208 may include, for example, a hard disk drive and/or a removable storage drive, representing a floppy diskette drive, a magnetic tape drive, a compact disk drive, and the like, where a copy of a computer program embodiment for applications for preventing errors may be stored. The secondary memories 208 may read from and/or write to between themselves in a well-known mariner.

Computing platform 200 may also include a keyboard 212, a mouse 214, and a display 210 for allowing a user to interface with computing platform 200. Keyboard 212, mouse 214, and display 210 may be coupled to communications bus 203. Computing platform 200 may also include a display adapter 216. Display adapter 216 may be coupled to communication bus 203. Display adapter 216 can interface with the communication bus 203 and the display 210 and can receive display data from the processor 202 and converts the display data into display commands for the display 210.

Computing platform 200 may also include a network adapter 218. Network adapter 218 may be coupled to communication bus 203. Network adapter 218 may allow computing platform 200 to send and receive data via a network, such as network 106.

According to embodiments of the present disclosure, any of the methods can be embodied on a computer readable storage medium as instruction for causing a computer platform to perform the instructions. The computer readable storage medium may include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software programs of the computer program on a CD-ROM or via Internet download. In a sense, the Internet itself as an abstract entity, is a computer readable medium. The same is true of computer networks in general.

Figure 3:
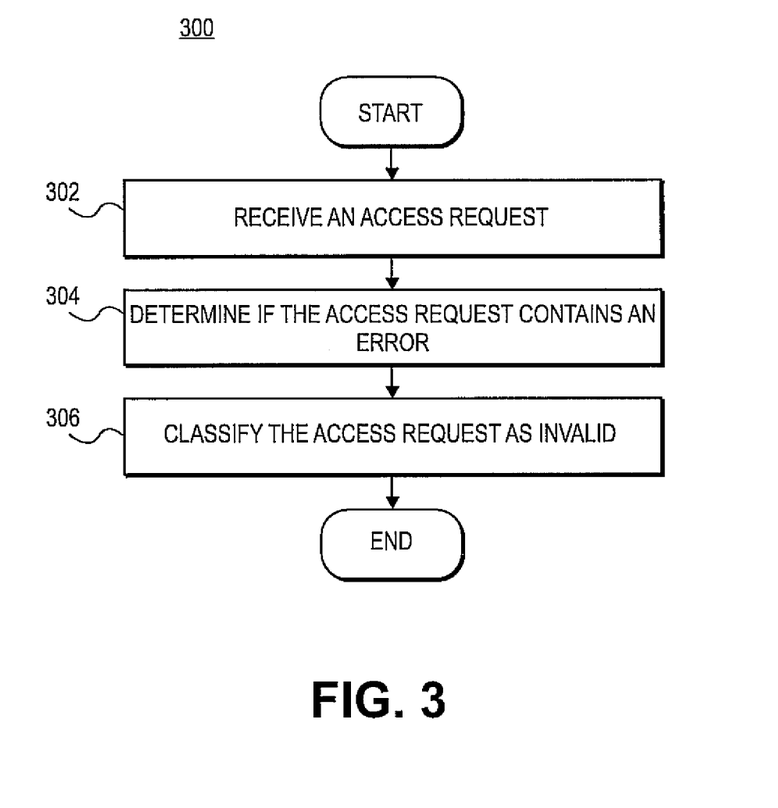
FIG. 3 is a flow diagram illustrating a method for preventing error in an access protocol consistent with embodiments of the present disclosure.

FIG. 3 is a flow diagram illustrating a method 300 for preventing an error in an access protocol consistent with embodiments of the present disclosure. According to embodiments, method 300 prevents an error in an access protocol by determining if an access request contains an error. If the access request contains an error, the access request will be classified as invalid. As such, the invalid access request will not count against the number of allowed access requests. Errors may include repeated passwords, obvious typographical error, and the like.

Method 300 may be implemented in any type of application for granting access to a secure system executed on a computing platform. For example, method 300 may be performed by a web browser or website host program executed on a computing platform. Method 300 may be performed on any computing platform or computing platform in a network system, such as computer platform 200 and network system 100 described above. One skilled in the art will realize that method 300 may be performed on any computing platform in which access to a system requires entry of access information.

As illustrated in FIG. 3, method 300 begins when the application receives an access request (stage 302). The access request may include access information such as a user name and password. For example, a network application may receive a request from a user to gain access to a secure website.

Next, the application examines the access request to determine if the access request contains an error (stage 304). An error may be determined in several ways. The application may compare the access request to previous access request to determine if the access request contains repeated information, for example, repeated passwords. The applications may analyze the access request to determine if the access request contains obvious typographical errors, such as erroneous capitalization (CAPS locks engaged).

Next, if the access request contains an obvious error, the application classifies the access request as an invalid access request (stage 306). In such a case, the invalid access request will count as an access request. As such, the invalid access request will not count against the number of allowed access requests. Additionally, the application may send a message to the user that informs the user of the obvious error in the access request.

Figure 4:
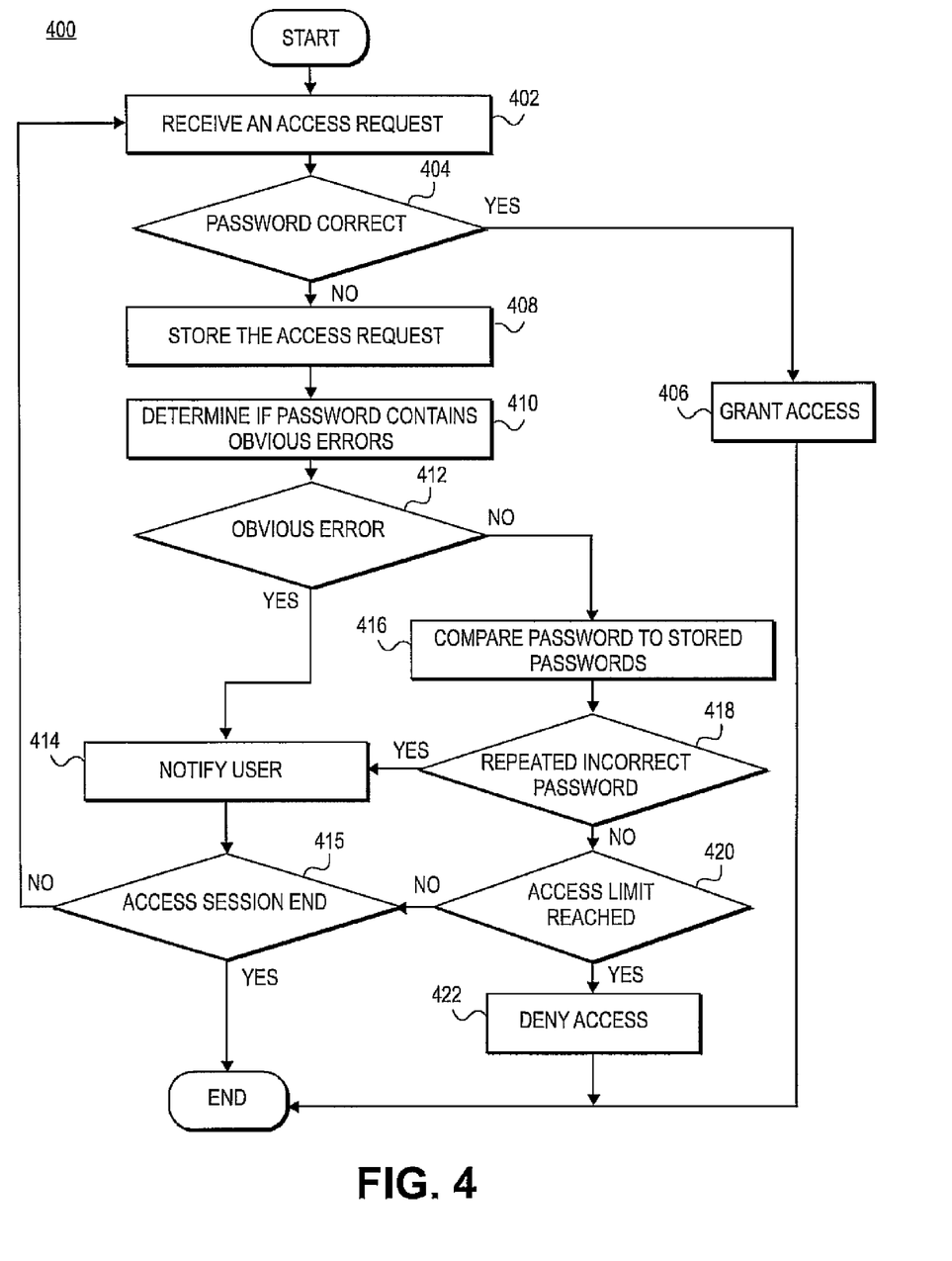
FIG. 4 is a flow diagram illustrating another method for preventing error in an access protocol consistent with embodiments of the present disclosure.

FIG. 4 is a flow diagram illustrating a method 400 for preventing error in an access protocol consistent with embodiments of the present disclosure. According to embodiments, method 400 prevents an error in an access protocol by determining if a password of the access request contains an error. If the password contains an error, the access request will be classified as invalid. As such, the invalid access request will not count against the number of allowed access requests. Errors may include repeated passwords, obvious typographical error in the password, etc.

Figure 5A:
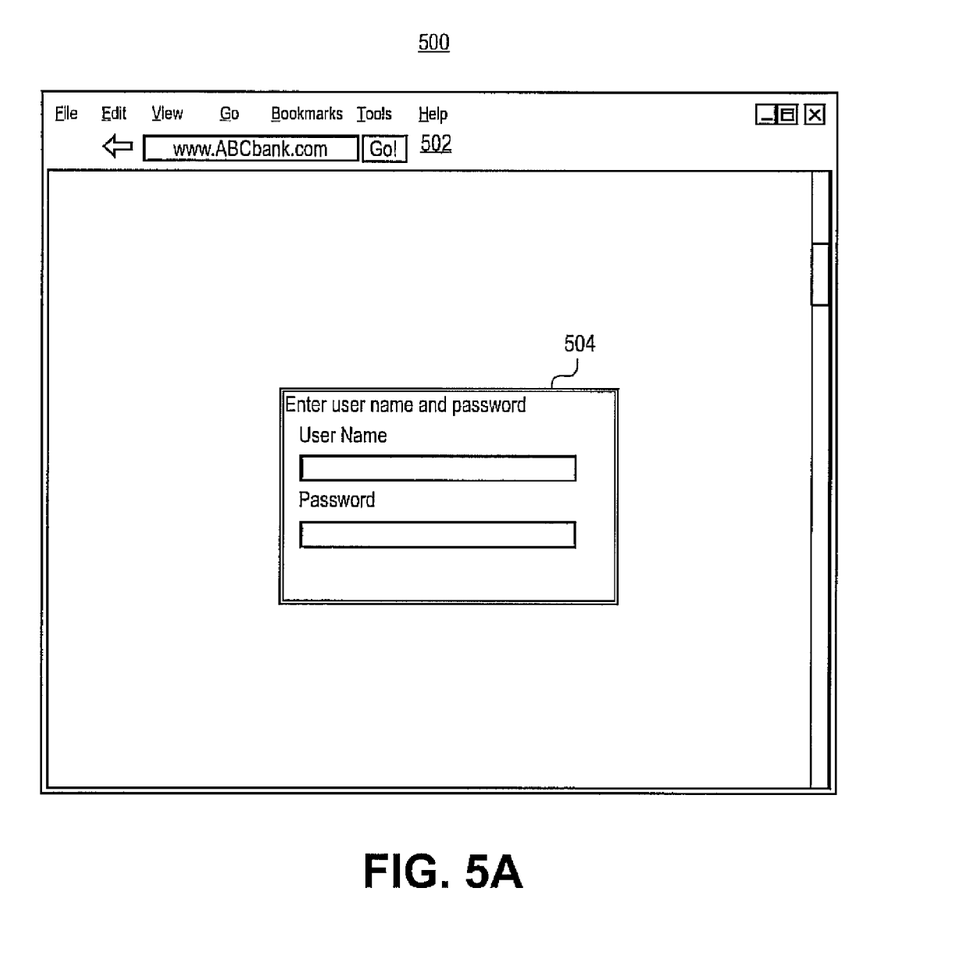
FIGS. 5A-C are diagrams illustrating an exemplary application window consistent with embodiments of the present disclosure.
Figure 5B:
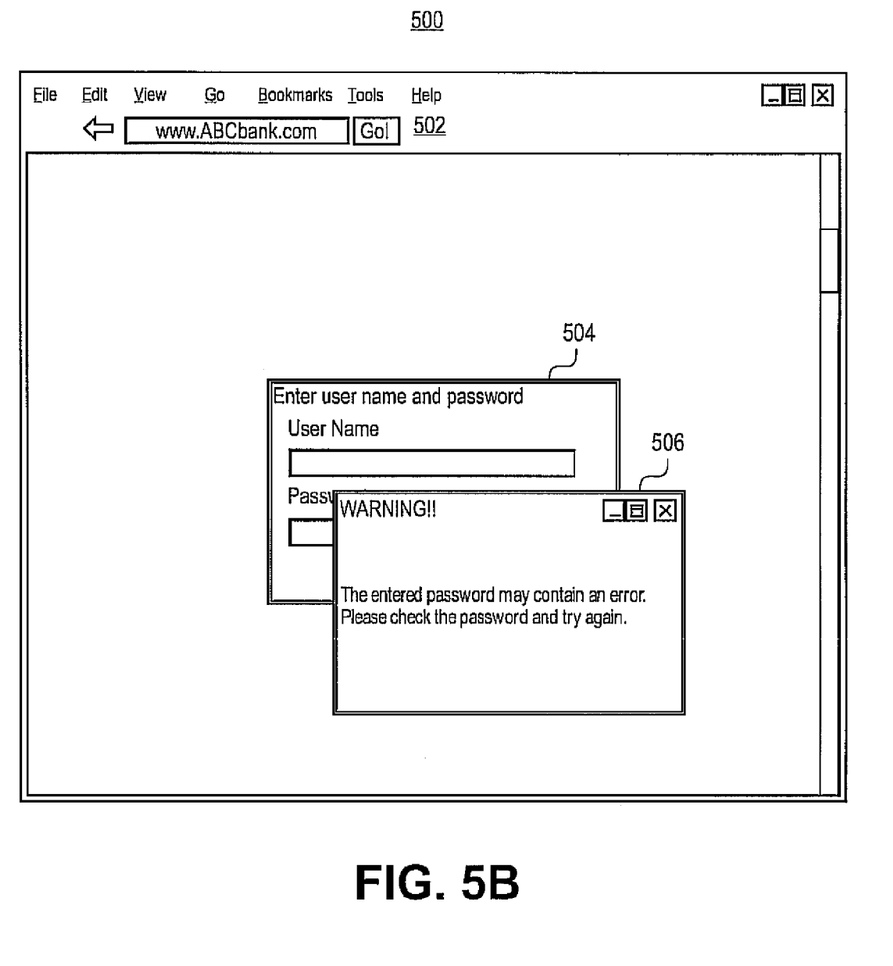
Figure 5C:
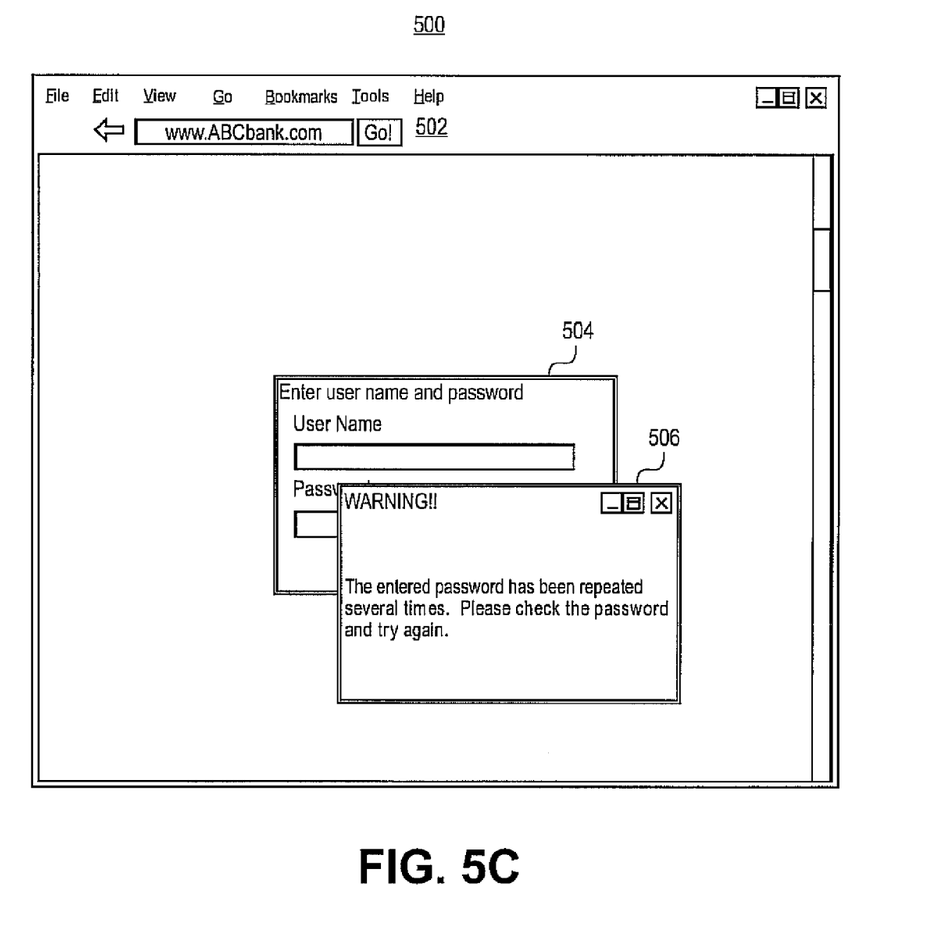

Method 400 may be implemented in any type of application for granting access to a secure system executed on a computing platform. For example, method 400 may be performed by a web browser or website host applications executed on a computing platform. FIGS. 5A-C are diagrams illustrating a web browser 500 implementing method 400 consistent with embodiments of the present disclosure. Method 400 implemented by browser 500 may be performed on any computing platform or computing platform in a network system, such as computer platform 200 and network system 100 described above. One skilled in the art will realize that method 400 may be performed on any computing platform in which access to a system requires entry of access information.

As shown in FIG. 4, method 400 begins when an application, for example a website browser or hosting application, receives an access request (stage 402). The access request may include access information such as a username and password. For example, as illustrated in FIG. 5A, a user may gain access to a secure website, for example (field 502), by entering a username and password in user interface (UI) 504 of browser 500. The website hosting application may receive the access request from browser 500 to gain access to a secure website, such as an SSL website Then, the application determines if the password is correct (stage 404). If the password is correct, the application grants access to the user (stage 406). If the access password is incorrect, the application stores the access information including the username and password (stage 408).

Next, the application determines if the password contains any obvious errors (stage 410 and 412). The application may determine if the password contains any obvious errors by performing a character analysis on the password. For example, the browser or host may determine that the password is capitalized which indicates a possible CAPS locks being engaged.

If the password contains an error, the application notifies the user of the error (stage 414). For example, the website hosting application may notify the user by instructing browser 500 to display a user interface. Likewise, browser 500 may inform the user independently. FIG. 5B illustrates an exemplary UI 506. UI 506 informs the user of the error in the password.

Since the access request contains an error, the access request will be classified as invalid. As such, the invalid access request will not count against the number of allowed access requests. The user may continue further access requests or end the access session (stage 415).

If the password does not contain an error, the application will compare the password to stored passwords of previous access requests in the same access session (stage 416). By the comparison, the application determines whether the password is identical to previously entered passwords in the same access session (stage 418). If the password is repeated, the application notifies the user of the repeated password (stage 414). For example, the website hosting application may notify the user by instructing browser 500 to display a user interface. Likewise, browser 500 may inform the user independently. FIG. 5C illustrates an exemplary UI 506. UI 506 informs the user of the repeated password.

Since access request contains a repeated password, the access request will be classified as invalid. As such, the invalid access request will not count against the number of allowed access requests. The user may continue further access requests or end the access session (stage 415).

If the password in not repeated, the application determines if the user has reached the number of allowed access requests (stage 420). If the number of allowed access requests has not been reached, the user may continue further access requests or end the access session (stage 415). If the number of access requests has been reached, the application may deny access to the user (stage 422). The application may take further action such as disabling the user access.

Method 400 has been described in relation to exemplary applications such as a web browser and website hosting application. One skilled in the art, however, will realize that method 400 may be implemented in any application which allows access to a system by requesting the user enter access information.

Other embodiments of the present teaching will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method comprising:
receiving a first access request from a user comprising a first password;
analyzing, by a processor, characters of the password to determine that the first password comprises an error having an associated error type of a plurality of obvious error types;
in response to determining that the password comprises the error:
notifying the user of the error and the associated error type; and
classifying the first access request as invalid, wherein classifying the first access request as invalid comprises determining not to count the first access request against a number of allowed access requests;
receiving a second access request from a user comprising a second password;
determining that the second password matches the first password;
classifying the second access request as invalid in response to determining that the second password matches the first password, wherein classifying the second access request as invalid comprises determining not to count the second access request against a number of allowed access requests to the processor; and
notifying the user that the user has repeated the error and identifying, to the user, the associated error type.

2. The method of claim 1, wherein the error comprises capitalization of all characters in the first password.

3. The method of claim 1, wherein the error comprises the first password matching a login name that accompanies the access request.

4. The method of claim 1, wherein the error comprises a typographical error.

5. A system comprising:
a processor; and
a memory comprising instructions that, when executed by the processor, cause the processor to perform operations comprising:
receiving a first access request from a user comprising a first password,
analyzing, by the processor, characters of the first password to determine that the first password comprises an error having an associated error type of a plurality of obvious error types,
notifying the user of the error and the associated error type, and
classifying the first access request as invalid, wherein classifying the first access request as invalid comprises determining not to count the first access request against a number of allowed access requests,
receiving a second access request from a user comprising a second password,
determining that the second password matches the first password,
classifying the second access request as invalid in response to determining that the second password matches the first password, wherein classifying the second access request as invalid comprises determining not to count the second access request against a number of allowed access requests to the processor, and
notifying the user that the user has repeated the error and identifying, to the user, the associated error type.

6. The system of claim 5, wherein the error comprises the first password matching a login name that accompanies the access request.

7. The system of claim 5, wherein the error comprises capitalization of all characters in the password.

8. The system of claim 5, wherein the error comprises a typographical error.

9. A method comprising:
   receiving, by a processor, a first access request from a user within an access session, wherein the first access request comprises a first password;
   analyzing, by the processor, characters of the first password to determine that the first password comprises an error having an associated error type of a plurality of obvious error types;
   in response to determining that the first password does not match the correct password associated with the user's account, storing, by the processor, the first password;
   notifying the user of the error and the associated error type;
   receiving, by the processor, a second access request from the user within the access session comprising a second password;
   determining, by the processor, that the second password does not match the correct password associated with the user's account;
   in response to determining that the second password does not match the correct password associated with the user's account, comparing, by the processor, the second password to the first password;
   determining, by the processor, that the second password matches the first password;
   classifying, by the processor, the second access request as invalid in response to determining that the second password matches the first password, wherein classifying the second access request as invalid comprises determining not to count the second access request against a number of allowed access requests; and
   notifying, by the processor, the user that the user has repeated the error and identifying, to the user, the associated error type.

10. The method of claim 9, wherein the error comprises a typographical error.

11. A system comprising:
   a processor; and
   a memory comprising instructions that, when executed by the processor, cause the processor to perform operations comprising:
      receiving a first access request from a user within an access session, wherein the first access request comprises a first password;
      analyzing, by the processor, characters of the first password to determine that the first password comprises an error having an associated error type of a plurality of obvious error types;
      in response to determining that the first password does not match the correct password associated with the user's account, storing the first password;
      notifying the user of the error and the associated error type;
      receiving a second access request from the user within the access session comprising a second password;
      determining that the second password does not match the correct password associated with the user's account;
      in response to determining that the second password does not match the correct password associated with the user's account, comparing the second password to the first password;
      determining that the second password matches the first password;
      classifying the second access request as invalid in response to determining that the second password matches the first password, wherein classifying the second access request as invalid comprises determining not to count the second access request against a number of allowed access requests to the processor; and
      notifying the user that the user has repeated the error and identifying, to the user, the associated error type.

12. The system of claim 11, wherein the error comprises a typographical error.

* * * * *